US011016736B2

(12) United States Patent
Norman

(10) Patent No.: US 11,016,736 B2
(45) Date of Patent: May 25, 2021

(54) CONSTRAINT PROGRAMMING USING BLOCK-BASED WORKFLOWS

(71) Applicant: Applied Materials, Inc., Santa Clara, CA (US)

(72) Inventor: David Everton Norman, Bountiful, UT (US)

(73) Assignee: Applied Materials, Inc., Santa Clara, CA (US)

(*) Notice: Subject to any disclaimer, the term of this patent is extended or adjusted under 35 U.S.C. 154(b) by 84 days.

(21) Appl. No.: 16/412,150

(22) Filed: May 14, 2019

(65) Prior Publication Data

US 2020/0019382 A1   Jan. 16, 2020

Related U.S. Application Data

(60) Provisional application No. 62/697,217, filed on Jul. 12, 2018.

(51) Int. Cl.
*G06F 8/20* (2018.01)
*G06F 8/35* (2018.01)

(52) U.S. Cl.
CPC . *G06F 8/20* (2013.01); *G06F 8/35* (2013.01)

(58) Field of Classification Search
None
See application file for complete search history.

(56) References Cited

U.S. PATENT DOCUMENTS 6,701,201 B2 * 3/2004 Hegde .................... G06Q 10/06
700/107

7,197,469 B2 * 3/2007 Hegde .................. G06Q 10/087
705/7.22

(Continued)

FOREIGN PATENT DOCUMENTS

CN  1786969 A  6/2006
CN  101303596 A  11/2008
(Continued)

OTHER PUBLICATIONS

Chen et al., "Optimal Supervisory Control of Flexible Manufacturing Systems by Petri Nets: A Set Classification Approach," IEEE, 2014, 15pg. (Year: 2014).*

(Continued)

*Primary Examiner* — Ryan D. Coyer
(74) *Attorney, Agent, or Firm* — Patterson + Sheridan, LLP

(57) ABSTRACT

Embodiments presented herein provide techniques for executing a block-based (BB) workflow to solve a constraint programming (CP) model related to a semiconductor manufacturing environment. Embodiments include receiving at least one BB workflow comprising a plurality of blocks. The plurality of blocks may specify a set of operations. Embodiments include accessing a plurality of block definitions corresponding to the plurality of blocks. Embodiments include executing the at least one BB workflow by performing the set of operations based on the plurality of block definitions, including extracting data from the semiconductor manufacturing environment, the data comprising both static data and dynamic data related to equipment in the manufacturing environment, creating the CP model based on the data and at least one constraint defined in the BB workflow, using a solver to determine a solution to the CP model; and publishing the solution to at least one component in the semiconductor manufacturing environment.

20 Claims, 7 Drawing Sheets

(56) References Cited

U.S. PATENT DOCUMENTS

| | | | |
|---|---|---|---|
| 8,869,165 B2* | 10/2014 | Dasgupta | G06F 9/5038 |
| | | | 718/106 |
| 9,846,598 B2* | 12/2017 | Wilkinson | G06F 9/4881 |
| 10,083,412 B2* | 9/2018 | Suntinger | G06Q 10/04 |
| 10,222,083 B2* | 3/2019 | Drees | H02J 3/008 |
| 2010/0257470 A1 | 10/2010 | Ari et al. | |
| 2014/0249882 A1* | 9/2014 | Li | G06Q 10/06313 |
| | | | 705/7.23 |
| 2017/0075332 A1* | 3/2017 | Norman | G05B 19/41865 |
| 2017/0075333 A1 | 3/2017 | Norman | |
| 2018/0103116 A1 | 4/2018 | Raghunathan et al. | |

FOREIGN PATENT DOCUMENTS

| | | |
|---|---|---|
| JP | 2009163655 A | 7/2009 |
| TW | 200307861 A | 12/2003 |
| TW | I402762 B | 7/2013 |
| TW | 201511151 A | 3/2015 |

OTHER PUBLICATIONS

Search Report for Taiwan Invention Patent Application No. 108115173, dated May 7, 2020.
International Search Report/Written Opinion issued to PCT/US2019/031325 dated Aug. 22, 2019.

\* cited by examiner

BLOCK PROPERTIES PANEL 415

BLOCK PROPERTIES PANEL 420

BLOCK PROPERTIES PANEL 425

BLOCK PROPERTIES PANEL 430

CONSTRAINT PROGRAMMING USING BLOCK-BASED WORKFLOWS

RELATED APPLICATIONS

This application claims the benefit of U.S. Provisional Application No. 62/697,217, entitled "CONSTRAINT PROGRAMMING USING BLOCK-BASED WORKFLOWS," by the same inventors, filed 12 Jul. 2018, the contents of which are incorporated herein in their entirety.

BACKGROUND

Field

Embodiments of the present disclosure generally relate to constraint programming, and more particularly to techniques for using block-based workflows for constraint programming.

Description of the Related Art

Manufacturing facilities across many different industries are responsible for producing products that are used in every facet of life. In the case of semiconductor manufacturing, for example, semiconductor manufacturing facilities manufacture products such as, microprocessors, memory chips, microcontrollers, and other semiconductor devices that have a ubiquitous presence in everyday life. These semiconductor devices are used in a wide variety of applications, examples of which include automobiles, computers, home appliances, cellular phones, and many others. Further, in recent years, both the number of applications and demand for devices (including semiconductor devices) has steadily increased. This increased demand has led manufacturing facilities to become increasingly conscious of increasing product variety and reducing delivery times.

Each manufacturing environment is unique and extremely complex, often requiring immense amounts of capital for the necessary equipment, tools, facilities, etc. Because manufacturing is so capital intensive, even small increases in factory performance (e.g., such as building to demand, shortening order to delivery time, etc.) can have large effects on financial performance (e.g., by reducing cost through leaner manufacturing, freeing up capital tied to idle inventory, etc.). For this reason, many manufacturing facilities have recently become interested in implementing scheduling systems in their facilities to manage the complexity, provide high-quality, on-time deliveries, etc. Scheduling in a manufacturing facility involves making complicated decisions about what operations should be performed and the order of these operations. As such, many scheduling systems involve the use of constraint programming.

Constraint programming can be used in a wide variety of constraint problems including scheduling, where a scheduling problem involves time and/or value restrictions placed in scheduling the tasks. Constraint programming can be used to find a solution which can satisfy all of the constraints. Constraint programming includes a set of search variables, domains that set boundaries for the possible values for each of the variables, and a set of constraints. Typical scheduling problems involve creating search variables for each task, including at least one variable to represent the equipment that can process a task and at least another variable to represent the start time for the task. In some cases variables may include an end time for the task, a task pause, a task resume, and others.

Existing techniques for creating constraint programming models require the use of custom code. Custom code, however, can be difficult to maintain and inflexible, which makes it difficult to make modifications. In many cases, for example, the manufacturing facility may undergo changes to account for new applications, tool improvements, etc. With constraint programming models that are created using custom code, however, adapting to such changes can require a level of technical expertise that may not be available to the manufacturing facility (e.g., an end user may not have coding experience, etc.), require a significant time commitment, substantial costs (e.g., due to the complexity of the facility), etc.

SUMMARY

Embodiments disclosed herein include methods, systems, and computer program products for constraint programming (CP) using block-based (BB) workflows in a manufacturing environment. In one embodiment, a method for executing a block-based (BB) workflow to solve a constraint programming (CP) model related to a semiconductor manufacturing environment is disclosed. The method includes: receiving at least one BB workflow comprising a plurality of blocks, wherein the plurality of blocks specify a set of operations for solving the CP model; accessing a plurality of block definitions corresponding to the plurality of blocks; and executing the at least one BB workflow by performing the set of operations based on the plurality of block definitions, comprising: extracting data from the semiconductor manufacturing environment, wherein the data comprises both static data and dynamic data related to equipment in the manufacturing environment; creating the CP model based on the data and at least one constraint defined in the BB workflow; using a solver to determine a solution to the CP model; and publishing the solution to at least one component in the semiconductor manufacturing environment (the solution may first be post-processed into a format usable by the one component), wherein the solution is used to determine a manufacturing schedule for the semiconductor manufacturing environment.

Another embodiment provides a non-transitory computer-readable medium containing computer program code that, when executed, performs an operation for executing a block-based (BB) workflow to solve a constraint programming (CP) model related to a semiconductor manufacturing environment is disclosed. The operation includes: receiving at least one BB workflow comprising a plurality of blocks, wherein the plurality of blocks specify a set of operations for solving the CP model; accessing a plurality of block definitions corresponding to the plurality of blocks; and executing the at least one BB workflow by performing the set of operations based on the plurality of block definitions, comprising: extracting data from the semiconductor manufacturing environment, wherein the data comprises both static data and dynamic data related to equipment in the manufacturing environment; creating the CP model based on the data and at least one constraint defined in the BB workflow; using a solver to determine a solution to the CP model; and publishing the solution to at least one component in the semiconductor manufacturing environment (the solution may first be post-processed into a format usable by the one component), wherein the solution is used to determine a manufacturing schedule for the semiconductor manufacturing environment.

Still another embodiment provides a system comprising at least one processor and a memory containing a program that, when executed by the at least one processor, performs an operation for executing a block-based (BB) workflow to solve a constraint programming (CP) model related to a semiconductor manufacturing environment is disclosed. The operation includes: receiving at least one BB workflow comprising a plurality of blocks, wherein the plurality of blocks specify a set of operations for solving the CP model; accessing a plurality of block definitions corresponding to the plurality of blocks; and executing the at least one BB workflow by performing the set of operations based on the plurality of block definitions, comprising: extracting data from the semiconductor manufacturing environment, wherein the data comprises both static data and dynamic data related to equipment in the manufacturing environment; creating the CP model based on the data and at least one constraint defined in the BB workflow; using a solver to determine a solution to the CP model; and publishing the solution to at least one component in the semiconductor manufacturing environment (the solution may first be post-processed into a format usable by the one component), wherein the solution is used to determine a manufacturing schedule for the semiconductor manufacturing environment.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
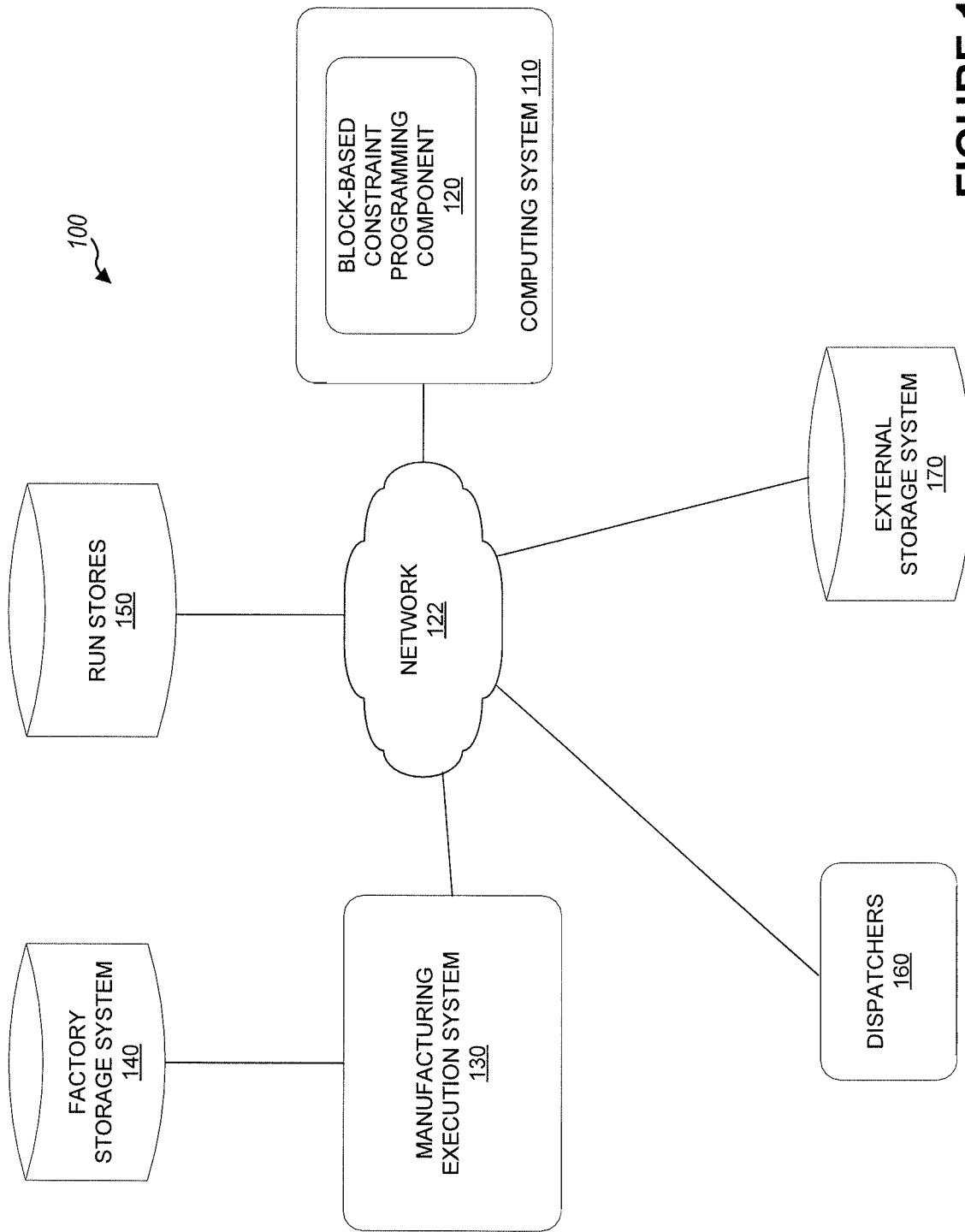
FIG. 1 illustrates a block diagram of an architecture of a manufacturing environment configured with a block-based constraint programming (CP) component, in accordance with embodiments of the present disclosure.

To facilitate understanding, identical reference numerals have been used, wherever possible, to designate identical elements that are common to the Figures. Additionally, it is contemplated that elements disclosed in one embodiment may be beneficially used in other embodiments described herein without specific recitation.

DETAILED DESCRIPTION

Embodiments presented herein present techniques for solving a constraint programming (CP) model in a manufacturing environment, using block-based (BB) workflows. The workflows can be used by an end-user to construct a CP system that creates and determines a solution to a CP model based on data captured from the manufacturing environment and/or constraints defined by the user via the BB workflow, and the solution may be used for scheduling and dispatching within the manufacturing environment (e.g., after being post-processed into a format usable by one or more components of the manufacturing environment and published to the one or more components). For example, each workflow contains an order of a series of operations (e.g., represented by one or more blocks of the workflow) that are performed in order to determine a solution for a CP model. Examples of these operations can include retrieving data from different sources, manipulating and transforming the data into different formats, analyzing the data, creating CP models based on the data (and, in some instances, based on user-defined constraints and/or parameters), determining a solution to the CP model, manipulating and transforming the solution into different formats, determining a manufacturing schedule based on the solution, providing or publishing the solution and/or schedule to multiple outputs, etc. By arranging and/or modifying blocks within the workflow, an end-user (e.g., of a manufacturing environment) can adapt the CP system to account for any change to the manufacturing environment, without having specialized programming knowledge or writing complicated scripting and code.

Today, manufacturing facilities have very complex environments in which facilities typically perform several different tasks related to the manufacture of a product. These tasks can include, but are not limited to, tasks for servicing tools (or equipment) within the manufacturing environment, tasks for using manufacturing tools, tasks for changing a tool setup, tasks for inspecting a manufacturing tool, tasks for performing one or more processes on resources (or an unfinished product) in order to manufacture a completed product, etc. In the case of semiconductor manufacturing, the semiconductor manufacturing process is generally divided into two parts, "front-end" and "back-end," both of which use different types of semiconductor manufacturing equipment. Front-end typically refers to wafer fabrication. For example, front-end manufacturing facilities generally start with blank semiconductor wafers (e.g., silicon wafers) and perform various processes, such as photolithography, deposition, etching, cleaning, ion implantation, chemical and mechanical polishing, etc., to fabricate a completed wafer with many semiconductor die on the wafer. Back-end typically refers to the assembly and testing of individual semiconductors. For example, once the front-end production process is completed, the completed wafers are transferred to a back-end manufacturing facility, which typically performs functions such as dicing the completed wafer into individual semiconductor die, testing, assembly, packaging etc. As such, front-end and back-end processes can consist of hundreds of processing steps performed by several different tools or automated devices within the manufacturing environment. To meet the ever increasing demand for manufacturing products, it is becoming increasingly important for manufacturing environments to schedule the series of complex tasks performed within the manufacturing environment and/or control the tools (or groups of tools) and automated devices within the manufacturing environment.

In order to perform scheduling in manufacturing environments, CP models are sometimes used. CP can be used to find a solution which can satisfy all of the constraints. CP includes a set of search variables, domains that set boundaries for the possible values for each of the variables, and a set of constraints. Scheduling problems involve creating search variables for each task: at least one variable to represent the equipment that can process a task and at least another variable to represent the start time for the task. Other variable are often included. In many cases, CP models have to be modified to account for changes in the manufacturing cycle (e.g., a change in the process flow, changes to processing times, different tool groups, new tools introduced, and the like) problems within the manufacturing environment (e.g., tool failures, defects in the output product, maintenance operations, and the like), new incoming orders, changes to orders, etc. Keeping CP models configured and maintained using existing techniques involves modifying custom code. This can involve complicated scripting and code to be written by a user with specialized programming knowledge, involve a significant amount of time, decreased productivity, etc.

As will be described in more detail below, embodiments provide techniques that can be used to define and configure CP processes that are open, configurable and extensible by the end user (e.g., of a manufacturing facility) through the use of block-based workflows. For example, an end-user can use the techniques presented herein to extend the workflow (e.g., to include additional steps, etc.), adjust processing order of a workflow, configure (or customize) the set of operations within the workflow, etc., all without the need to understand or write any code. As such, the CP system presented herein provides manufacturing facilities with the ability to configure and maintain CP processes despite changing circumstances and without requiring specialized programming knowledge, or difficult and time-consuming operations that are associated with conventional techniques.

One embodiment includes a method for executing, by a block-based (BB) CP component, at least one BB workflow to create and solve a CP model related to a manufacturing environment (e.g., front-end or back-end semiconductor facility or factory). Within the manufacturing environment, several tools (or equipment) can be available for processing raw material or a work-in-progress (e.g., unfinished goods) to produce a completed product. For example, in semiconductor manufacturing, one or more tools can be used to process one or more lots during front-end processing, back-end processing, etc. For front-end, the one or more lots generally refer to one or more blank semiconductor wafers. For back-end, the one or more lots generally refer to one or more semiconductor die (e.g., on completed semiconductor wafers).

In one embodiment, the BB CP component allows for determining a solution to a CP model that is created based on the state of a manufacturing facility and its components. A solution generally refers to a set of values (e.g., to be assigned to variables in the CP model) that satisfy the constraints of the model. Constraints generally refer to restrictions, such as time and/or value restrictions, that apply to variables in the CP model (e.g., an inspection task can only be started if a counter has a value that is greater than a threshold). Variables generally include task state variables (e.g., task start, task end, task pause, task resume, etc.), task equipment variables (e.g., representing the station capable of performing a task), etc. A domain for a variable defines allowed values for that variable. A domain sets boundaries for the possible values for each of the variables.

To create the CP model, the BB CP component can extract data from the manufacturing environment. The data can include static data (e.g., equipment used by a source system, capability of different pieces of the equipment, etc.) and dynamic data (e.g., current equipment state, products being currently processed by equipment of a source system, the product characteristics, etc.). The BB CP component may also use constraints defined by the user via the BB workflow in creating the CP model. For example, the BB CP component may create the CP model by defining logic using the plurality of variables, domains, constraints, and the like. To solve the CP model, the BB CP component may provide the CP model to a CP solver, which determines a solution that satisfies the constraints. An example of a CP solver is Gecode, which uses search engines (e.g., depth first search, branch-and-bound, etc.) to find a solution to a CP model. A solution may be a model that contains single values for all variables. The BB CP component can publish the determined solution to at least one device or component (e.g., to perform scheduling/dispatching in the manufacturing environment, etc.). In certain embodiments, the solution is post-processed to convert the solution into a format that is usable by the at least one device or component. In some embodiments, a scheduling component is used to determine a manufacturing schedule based on the solution (e.g., a schedule that is in accord with the values of the variables in the solution). The post-processed solution and/or schedule may be processed and/or converted into a form usable by additional devices or components, and may be published to the additional devices and/or components (e.g., via dispatchers).

In one embodiment, the BB CP component performs each of the above operations based on various blocks within a BB workflow. Each block of the BB workflow specifies one or more operations of the set of operations that the BB CP component performs when the BB CP component executes the workflow. Using the techniques presented herein, a user can edit and/or customize the sequence of operations (that are executed by the BB CP component) by changing the order of the blocks in the BB workflow, adding/removing blocks in the BB workflow, adding/removing links (e.g., representing data flow) between blocks in the BB workflow, etc. For example, a user may generate and/or edit the BB workflow via a user interface that supports drag-and-drop input. Further, the techniques presented herein also allow a user to configure some or all of the operations within one or more blocks of the BB workflow with one or more BB rules and reports. For example, upon executing one or more blocks in the BB workflow, the BB CP component may further evaluate at least one BB sub-rule or report configured for the respective workflow block in order to perform the operations specified by the workflow block. Doing so in this manner provides manufacturing facilities the ability to edit, and customize (e.g., without understanding or writing code) CP operations to account for any changes in the manufacturing facility. BB reports, rules, and sub-rules can be created by a user and allow the user to configure, without the need to understand or write any code, the operations for each block in the BB workflow(s). In this manner, the techniques presented herein allow the user to customize the operations for the blocks in the CP workflow that may be used to extract data, convert the data, and/or perform error checking.

Note that, for the sake of convenience, terminology related the manufacture of semiconductor devices is used in much of the following description as a reference example of a manufacturing production process that can be scheduled based on solutions generated using the techniques presented herein. Similarly, many of the following embodiments use front-end and back-end semiconductor manufacturing facilities as reference examples of types of manufacturing environments in which the techniques presented herein can be used to provide a CP system that is open, extensible, and fully configurable by an end-user. Note, however, that the techniques presented herein can also be applied to other types of manufacturing environments (e.g., in other industries), manufacturing processes, etc.

FIG. 1 is a block diagram illustrating an architecture of a manufacturing environment (or system) 100, in which aspects of the present disclosure may be practiced. For example, in one embodiment, the manufacturing environment 100 is an example of a semiconductor manufacturing system. As shown, the manufacturing environment 100 includes a computing system 110, manufacturing execution system (MES) 130, factory storage system 140, dispatchers 160, run stores 150 and external storage system 170 connected via a network 122. In general, the network 122 can be a wide area network (WAN), local area network (LAN), wireless LAN (WLAN), etc. The factory storage system 140, external storage system 170 and run stores 150, in general, can be any kind of storage system, including, for example, relational and/or hierarchal databases, distributed filing systems, etc. In one embodiment, the computing system 110, MES 130, and dispatchers 160 can be any kind of physical computing system having a network interface, such as a desktop computer, laptop computer, mobile device, tablet computer, server computing systems, gateway computers, and the like.

The MES 130 is generally configured to manage and control the operation of a current work-in-progress (WIP) within the manufacturing environment 100. For example, the MES 130 can monitor the operation of one or more tools (or equipment) operating in the manufacturing environment 100, receive data directly from the tools, analyze data from the tools, and/or collect the data. In one embodiment, the MES 130 can store the data (received from the tools) into factory storage system 140. Such information stored in the factory storage system 140 can include information regarding the current WIP, current tool state, manufacturing data, etc.

As shown, the computing system 110 includes BB CP component 120. The BB CP component 120 generally represents logic (e.g., a software application, device firmware, an ASIC, etc.) that is configured to implement one or more of the techniques presented herein. For example, the BB CP component 120 could perform method 500 illustrated in FIG. 5, method 600 illustrated in FIG. 6, and/or any of the techniques (or combination of techniques) described herein. In one embodiment, the BB CP component 120 creates a CP model and determines a solution to the CP model by executing a BB workflow defined by a user (e.g., via a user interface). For example, in the case of semiconductor manufacturing, the manufacturing system can perform several different tasks related to the fabrication of semiconductor wafers (e.g., associated with front-end processing), cutting, assembly, and testing of semiconductor die on the wafers (e.g., associated with back-end processing), and the like. The BB CP component 120 may retrieve data from the manufacturing environment 100, such as from the MES 130 and other devices/components (e.g., a material control system (MCS) and/or other tools). In one embodiment, the BB CP component 120 creates a CP model based on the data (which may first be transformed or converted into an appropriate format for use in CP) and based on constraints defined by the user via the BB workflow. The BB CP component 120 then uses a solver to determine a solution to the CP model that satisfies all of the constraints of the CP model. The solution may be post-processed, such as by converting the solution into a format compatible with at least one other component (e.g., a scheduling component, which may also be located on computing system 110 or one a separate system) or device, and then may be published to the at least one other component or device.

In some cases, the manufacturing system may have a large number of lots that need to be processed. To manage the processing, a scheduling component may periodically generate schedules (e.g., every five minutes, ten minutes, or some other configurable time period) based on solutions determined by the BB CP component 120 to allocate some or all of the lots to available tools, sequence the lots, etc. For example, the schedule can include a list of which tasks should be processed on which tool and at what time. In one embodiment, a schedule is generated based on the solution and is then provided to dispatchers 160, which are generally configured to dispatch (e.g., according to the schedule) the lots to the tools for processing. For example, dispatchers 160 may automate the one or more devices within the manufacturing environment according to the generated schedule. Alternatively or additionally, solutions and/or schedules may be written (or saved) by the BB CP component 120 or another component to an external storage system 170. Maintaining the solutions, post-processed results, and/or schedules in the external storage system 170 allows the solutions and/or schedules to be made available to different entities.

In one embodiment, the BB CP component 120 is configured to execute one or more BB workflows in order to solve a CP model. The BB CP component 120 can receive a workflow (e.g., created by an end-user via a user interface) that includes a plurality of blocks where each block in the workflow specifies one or more operations that are performed when the BB CP component 120 executes the respective block. This workflow can be more easily edited and/or customized (e.g., by a user) without any specialized programming knowledge, relative to conventional scripting solutions. For example, the user can re-arrange the blocks in the workflow (e.g., to adjust the steps that the BB CP component 120 performs related to creating or solving a CP model), add blocks to the workflow (e.g., to add steps that the BB CP component 120 performs related to creating or solving a CP model), and/or remove blocks from the workflow (e.g., to remove steps that the BB CP component 120 performs related to creating or solving a CP model). As described below, the user can also configure the specific operations for one or more blocks in the workflow with a BB sub-rule and/or report. Doing so in this manner provides a fully configurable CP system that allows manufacturing systems to adapt their CP systems, as needed, without the complexities involved in modifying custom code.

In one embodiment, the BB CP component 120 is configured to write, for each CP run, some or all the input and/or output data associated with the blocks of the workflow to the run stores 150. This data captures the state of the manufacturing system at one or more steps of a CP run, such that, in the event there is a problem with a solution or schedule that is based on a solution, the manufacturing system can reproduce the problem since all data needed to reproduce what occurred is available in run stores 150. In this manner, the manufacturing system can troubleshoot any problems by retrospectively debugging the system.

Note, however, that FIG. 1 illustrates merely one possible arrangement of the manufacturing environment 100. More generally, one of ordinary skill in the art will recognize that other embodiments of manufacturing systems can also be configured to implement CP techniques in accordance with the techniques presented herein. For example, although the computing system 110, MES 130 and dispatchers 160 are shown as separate entities, in other embodiments, these components could be included as part of one computing system.

Figure 2:
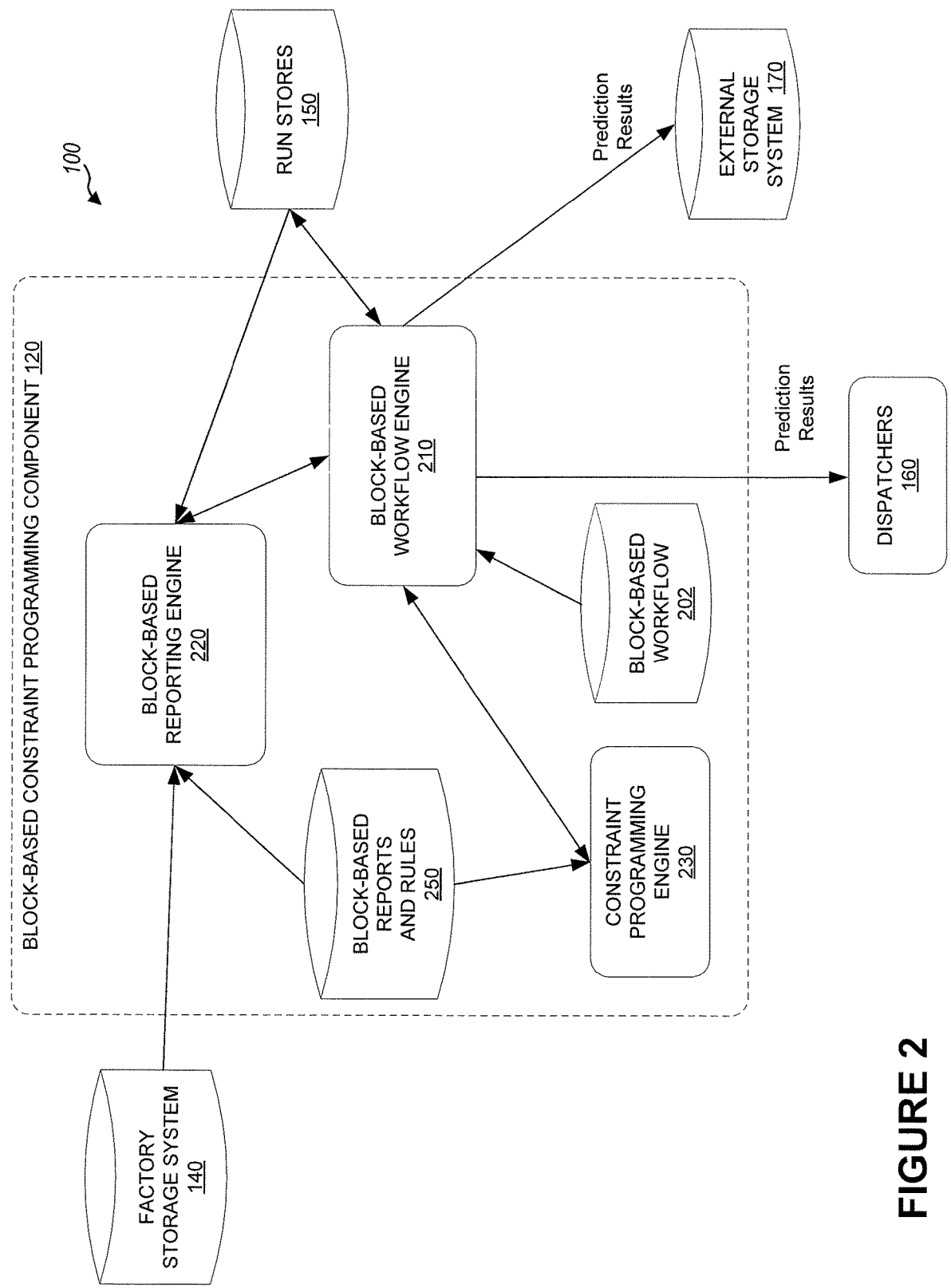
FIG. 2 illustrates a block diagram of an architecture of a block-based CP component within a manufacturing environment, in accordance with embodiments of the present disclosure.

FIG. 2 further illustrates an example of the BB CP component 120 described relative to FIG. 1, according to one embodiment. The BB CP component 120 is configured to create and solve a CP model related to the manufacturing environment 100 and its components. For example, the CP model (created by the BB CP component 120) may specify logic (e.g., in the form of an executable program) that is based on a plurality of variables, domains, constraints, and the like. A solution to the CP model may comprise a model that includes single values for the variables that satisfy the constraints of the CP model.

As shown, the BB CP component 120 includes a BB workflow engine 210, a BB reporting engine 220, a CP engine 230, BB reports and rules (RR) storage system 250, and a BB workflow storage system (e.g., database) 202. In one embodiment, the BB workflow engine 210 interacts with and manages BB reporting engine 220, and CP engine 230 in order to create and solve a CP model related to the manufacturing environment 100. The BB workflow storage system 202 includes one or more BB workflows, each of which can be used (e.g., by the BB CP component 120) to perform operations related to creating and solving a CP model. The BB workflows can be created, edited and/or customized by a user and stored in the BB workflow storage system 202.

In one embodiment, the BB workflow engine 210 receives at least one BB workflow (e.g., from a user) or retrieves at least one BB workflow (e.g., from BB workflow storage system 202, etc.) and executes each of the blocks in an order specified within the BB workflow(s). As mentioned above, each block of the BB workflow(s) specifies one or more operations that are performed (e.g., by one of the BB reporting engine 220, CP engine 230, etc.) when the BB workflow engine 210 executes the respective block. Examples of operations that can be included within the BB workflow(s) include, but are not limited to, retrieving data about the manufacturing facility, transforming and manipulating the data, creating a CP model based on the data and based on constraints defined by the user in the BB workflow, determining a solution for the CP model, making the solution available to one or more requestors, saving information about the state of the manufacturing facility, performing error checking on the CP model, solution, and data, reporting the error to a user, generating a schedule based on the solution, publishing the schedule, etc. In this manner, the BB workflow engine 210 can control the sequence of operations that the BB CP component 120 performs to provide a solution.

According to various embodiments, depending on the blocks specified in the BB workflow(s), the BB CP component 120 can use one of the BB workflow engine 210, BB reporting engine 220, or CP engine 230 to execute the respective block. For example, in one embodiment, the BB CP component 120 can extract, via the BB reporting engine 220, data about the manufacturing environment 100 from the factory storage system 140. In some embodiments, the BB reporting engine 220 can query other systems and/or web services (e.g., using representational state transfer (REST), or some other communication protocol) for data about the manufacturing environment 100. Such data can include, for example, descriptions of equipment in the manufacturing environment 100, capabilities of different pieces of equipment, current state of equipment, what product is currently being processed by equipment, characteristics of the product, and the like.

Upon extracting the information, the BB CP component 120 can use the BB reporting engine 220 to perform one or more transformations or manipulations on the extracted data. For example, the data extracted from factory storage system 140 may be in a format (or schema) that is specific or proprietary to the manufacturing environment 100 and not compatible with the BB CP component 120. In these situations, the BB reporting engine 220 can convert the data from the proprietary format to a common schema that is compatible with the rest of the BB CP component 120. In addition, the BB reporting engine 220 can evaluate the data in the proprietary format and common schema data for errors, and if errors are detected, correct the errors in the common schema data, and report the errors to a user (e.g., via email, storing in a database, etc.). In some embodiments, the BB reporting engine 220 can use at least one BB sub-rule and/or report within the BB RR storage system 250 to perform the data extraction, data conversion, error checking, etc. For example, the BB reports and/or rules can be created by a user and allow the user to configure, without the need to understand or write any code, the operations for each block in the BB workflow(s). In this manner, the techniques presented herein allow the user to customize the operations for the blocks in the CP workflow that may be used to extract data, convert the data, and/or perform error checking.

In one embodiment, once the BB reporting engine 220 converts the extracted data into a common CP schema and performs error checking on the common schema data, the BB workflow engine 210 may evaluate the data, create a CP model based on the data and constraints, determine a solution to the CP model, and the like. In some embodiments, the BB workflow engine 210 can use the CP engine 230 to create the CP model and determine the solution. Note that, although the CP engine 230 and BB reporting engine 220 are shown within the BB CP component 120, in some embodiments, the CP engine 230 and/or BB reporting engine 220 can be external to the BB CP component 120.

The CP engine 230 can be configured with one or more BB rules and/or reports created by a user and stored in the BB report and rules (RR) storage system 250. One or more BB reports can be used to configure, define, and/or modify constraints, specify settings, convert data into a format understood by the CP engine 230, etc. In addition or alternatively, one or more BB rules (created by a user) can be used to configure an objective function for the CP model, determine which constraints will govern the CP model, process the results of the CP engine 230 that creates and solves the CP model (e.g., which can include converting the results back to the common schema, etc.), and the like.

In one embodiment, once the CP engine 230 determines the solution, the CP engine 230 provides the solution to the BB workflow engine 210, which can publish the solution or a schedule based on the solution to at least one of the dispatchers 160 or external storage system 170. In one embodiment, the BB workflow engine 210 can use at least one BB report and/or rule (e.g., within BB RR storage system 250) to process the solution (e.g., converting the solution to a format used by the manufacturing environment, etc.) before publishing the solution or a schedule determined based on the solution to at least one of the dispatchers 160 or external storage system 170.

As mentioned above, the techniques presented herein also allow the BB CP component 120 to evaluate generated solutions and perform troubleshooting in the event of any problems or errors. For example, in one embodiment, upon receiving the input and output data associated with the execution of each block in the BB workflow, the BB workflow engine 210 writes some or all of the input and/or output data for one or more blocks to the run stores 150. For example, for each CP run, the BB workflow engine 210 can write any one of the extracted data, common schema data, CP model and its results, CP model input and output, published solutions, and other information associated with blocks in the BB workflow to the run stores. In one embodiment, the BB workflow engine 210 writes to a file system directory (within the run stores 150) that is unique to each CP run. In this manner, the BB CP component 120 is able to reproduce the state of the manufacturing environment 100 for one or more steps of a CP run. The BB CP component 120, for example, can evaluate the data associated with one or more steps via the BB reporting engine 220 (and via one or more BB reports and rules) to determine any changes that need to be made to the CP process. As such, the techniques presented herein allow for retrospective debugging, since all the data associated with one or more steps of a CP run can be made available via the run stores 150.

Note, however, that FIG. 2 illustrates merely one possible arrangement of the BB CP component 120. More generally, one of ordinary skill in the art will recognize that other embodiments of the BB CP component 120 can also be configured to create and solve CP models in accordance with the techniques presented herein. For example, although the BB workflow engine 210, BB reporting engine 220, and CP engine 230 are shown as separate entities, in other embodiments, these components could be included as part of one computing system.

Figure 3:
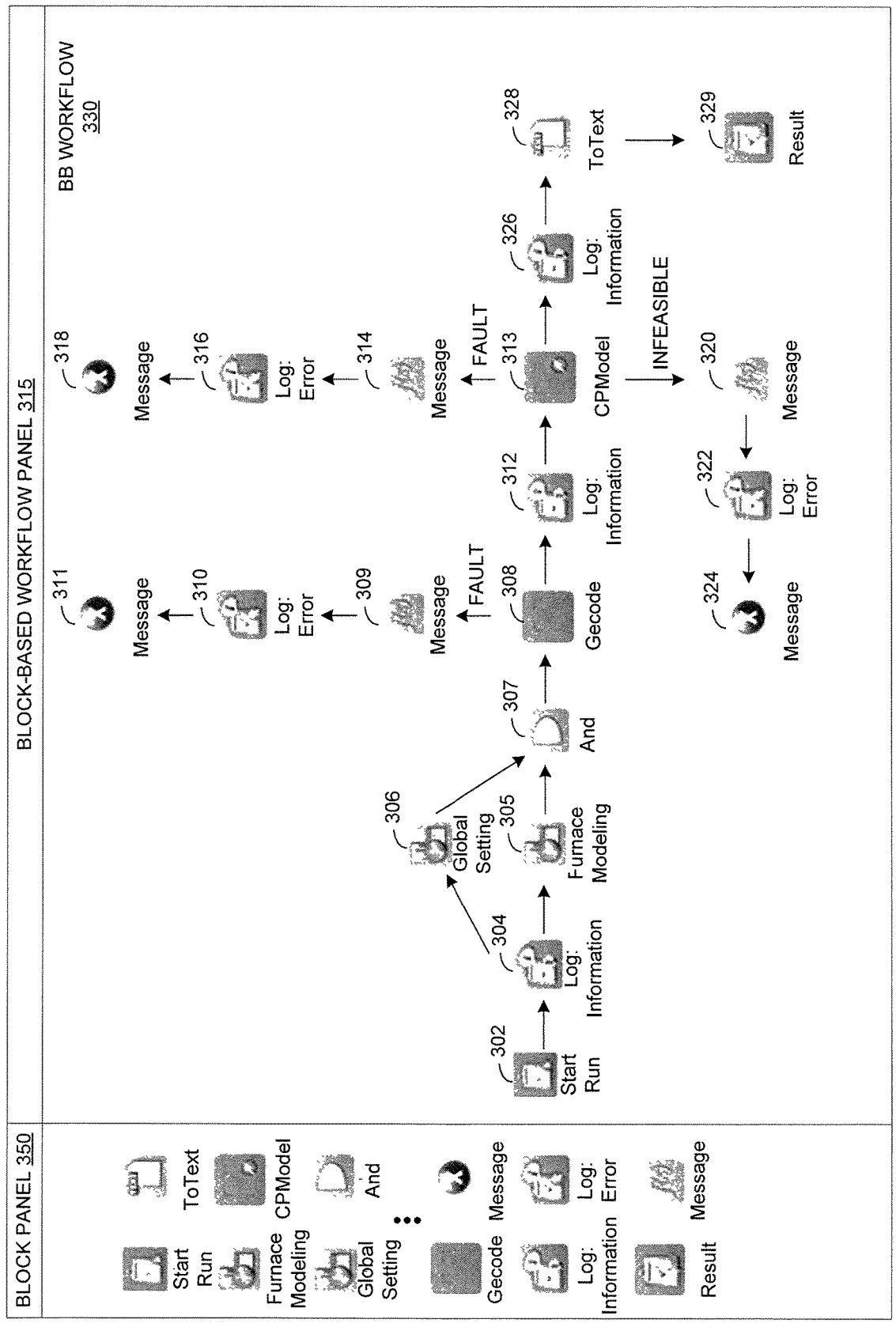
FIG. 3 illustrates an interface with a block-based workflow for solving a CP model in a manufacturing environment, in accordance with embodiments of the present disclosure.

FIG. 3 illustrates a user interface 300 with a BB workflow 330 that can be used to determine a solution to a CP model related to a manufacturing environment, according to one embodiment. As shown, the user interface 300 includes a block panel 350 and a BB workflow panel 315. The block panel 350 includes a plurality of blocks that allow a user to customize operations within a BB workflow to determine a solution for a CP model related to a manufacturing environment. In this embodiment, each block is depicted as a small image characteristic of the block's function. However, note that, in general, the blocks can be depicted in other manners (e.g., size, shape, color, etc.). BB workflow panel 315 illustrates one example of a BB workflow 330. Note that, for the sake of convenience, only a portion of the BB workflow 330 is illustrated. More generally, those of ordinary skill in the art will recognize that a user can create and/or modify any BB workflow to include any number of blocks.

In one embodiment, the user interface (UI) 300 is a graphical user interface (GUI) that allows the user to drag and drop blocks from block panel 350 into BB workflow panel 315. The user can arrange the blocks (in BB workflow panel 315) in any order or configuration, which allows the user to quickly adapt the CP system to any changes within the manufacturing environment, without understanding or writing any code. For example, each block in the block panel 350 is a logical abstraction that represents an operation or a series of operations that can be performed related to creating a solving a CP model. In one embodiment, the UI 300 allows the user to specify one or more properties for each block in the workflow panel 315. The one or more properties can specify a data source for the block, timing of one or more operations associated with the block, constraints, and/or other criteria associated with performing the operations associated with the block. Examples of block properties panels are shown below in FIGS. 4A-D. In one embodiment, the operations and/or the properties for each block in the BB workflow panel 315 can be stored in one or more block definition files that the BB CP component can access in order to execute each block.

In one embodiment, once the BB CP component 120 executes the BB workflow, the BB CP component 120 reads the definition files, converts the operations listed in the files into a low-level script that the BB CP component 120 executes to create a CP model and determine a solution to the CP model. The BB CP component 120 can provide the solution or post-processed solution to other devices or components (e.g., a scheduling component), evaluate the solution for errors, or provide the solution or post-processed solution to anyone that requests the solution.

In another embodiment, once the BB CP component 120 retrieves at least one BB workflow from the BB workflow storage system 202, the BB CP component 120 reads and parses the BB workflow to determine the type of blocks within the BB workflow. The BB CP component 120 can access one or more block definitions corresponding to each type of block within the BB workflow. The BB CP component 120 can execute the BB workflow based on the block definitions and/or the properties of the blocks in the BB workflow. For example, in one implementation, the BB CP component 120 can determine at least one function to call to perform the operations in the block (e.g., execute the block) based on the block type and/or properties of the block. The BB CP component 120 can then execute the BB workflow by performing the set of operations using the determined functions.

In this particular embodiment, this portion of the BB workflow 330 includes blocks 302-329, which together specify a sequence of operations which, when executed by the BB CP component 120, can result in solving a CP model related to a manufacturing environment. Specifically, block 302 defines a start operation that triggers the initial execution of the BB workflow 330. Block 304 defines an operation for writing results of the start operation to a log file. Blocks 305 and 306 are connected by an "and" block 307, which means that the operations in both blocks 305 and 306 are performed (e.g., simultaneously). Block 305 defines a furnace modeling operation that loads/collects customer data (e.g., data collected from one or more tools in the manufacturing environment). Block 306 defines global setting operation that modifies one or more settings associated with the CP process.

Block 308 defines an operation that creates the CP model related to the manufacturing environment based on data collected from the manufacturing environment and based on constraints defined by the user. Blocks 309-311 represent operations for handling errors related to executing the operation defined by block 308, such as a "FAULT" condition, including sending messages to a user and/or other component related to an error.

Block 312 defines an operation for writing the results of executing the operation defined by block 308 to a log file. Block 313 defines an operation for determining a solution to the CP model. For example, the operation may include using a solver to determine the solution. Blocks 314-318 represent operations for handling errors related to executing the operation defined by block 313, such as a "FAULT" condition, including sending messages to a user and/or other component related to an error. Blocks 320-324 represent operations for handling different errors related to executing the operation defined by block 313, such as an "INFEASIBLE" condition (e.g., if there is no feasible solution to the CP model that satisfies all constraints), including sending messages to a user and/or other component related to an error. Block 326 defines an operation for writing the results of executing the operation defined by block 313 to a log file.

Block 328 represents an operation for outputting results of previous blocks (e.g., the solution) to a text file (and/or converting the solution to a different format, determining a schedule based on the solution, etc.). Block 329 defines an operation for outputting a result, such as a solution, such as by publishing the solution to one or more devices or components. In some embodiments, one or more of blocks 326-329 also define operations for post-processing the solution to create input that is usable for other purposes, such as determining a schedule based on the solution.

Note that the BB workflow 330 depicted in FIG. 3 and described above represents merely one example of a sequence of blocks that can be configured, e.g., by a user without coding. In general, the techniques presented herein can be used to modify and/or customize a scheduling system to any manufacturing environment.

It is noted that, while BB workflow 330 includes two separate blocks 308 and 313 for creating and solving the CP model, these blocks may alternatively be combined into a single block that both creates and solves the CP model.

Figure 4A:
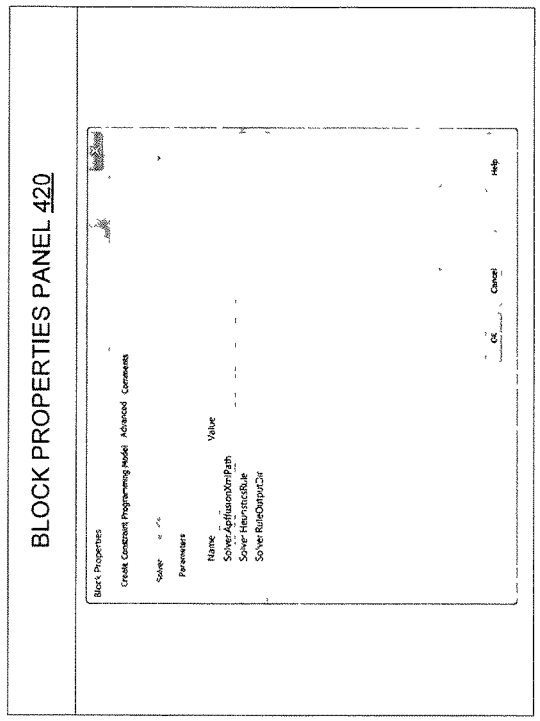
FIGS. 4A, 4B, 4C, and 4D illustrate example block properties panels that can be used to configure sets of operations to be performed for particular blocks in a BB workflow, according to one embodiment.

FIG. 4A illustrates an example block properties panel 415 that can be used to configure a set of operations to be performed for a particular block in a BB workflow, according to one embodiment. For example, block properties panel 415 may be used to configure operations to be performed for block 308 or block 313 of BB workflow 330 in FIG. 3. In certain embodiments, block properties panel 415 is launched by a user interaction with a block, such as double-clicking on the block or right-clicking on the block and selecting a "block properties" menu item associated with the block.

Block properties panel 415 includes several properties that can be selected and/or modified by a user. For example, block properties panel 415 allows the user to specify a solver for the CP model and other information related to creating a CP model (e.g., model data for the CP model, such as constraints). For instance, the user may specify constraints for the CP model using block properties panel 415.

Figure 4B:
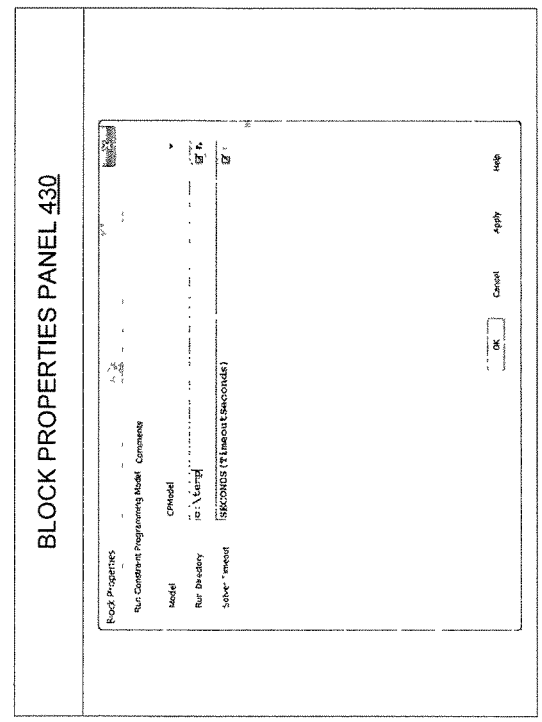

FIG. 4B illustrates an example block properties panel 420 that can be used to configure a set of operations to be performed for a particular block in a BB workflow, according to one embodiment. For example, block properties panel 420 may be used to configure operations to be performed for block 308 or block 313 of BB workflow 330 in FIG. 3. Block properties panel 420 includes several properties that can be selected and/or modified by a user. For example, block properties panel 420 allows the user to specify advanced parameters for the solver to be user for determining a solution to the CP model.

Figure 4C:
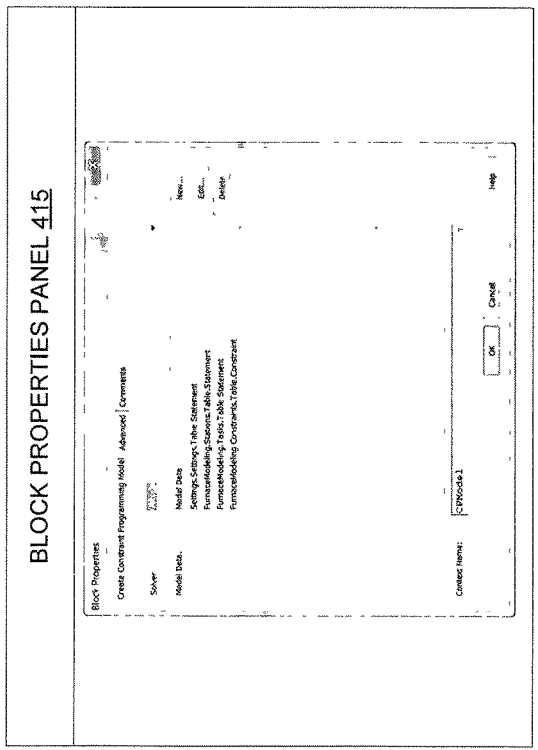

FIG. 4C illustrates an example block properties panel 425 that can be used to configure a set of operations to be performed for a particular block in a BB workflow, according to one embodiment. For example, block properties panel 425 may be used to configure operations to be performed for block 308 or block 313 of BB workflow 330 in FIG. 3 or a different block that defines operations for modifying a CP model. Block properties panel 425 includes several properties that can be selected and/or modified by a user. For example, block properties panel 425 allows the user to specify model data that is used to modify the CP model.

Figure 4D:
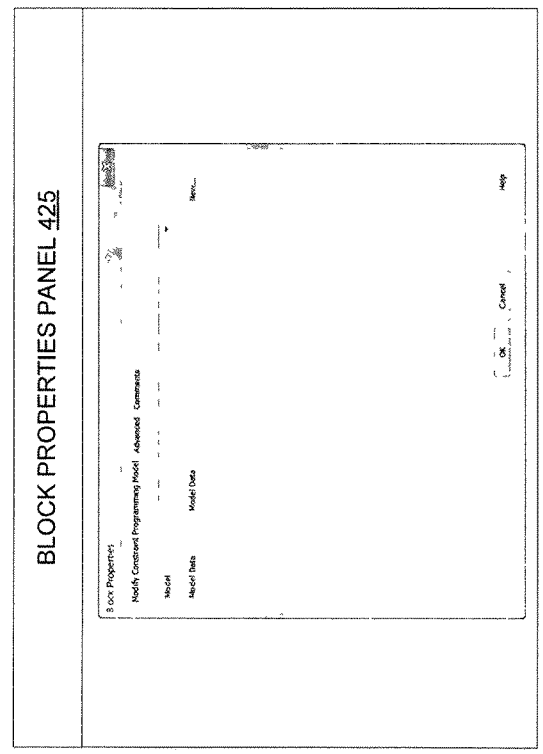

FIG. 4D illustrates an example block properties panel 430 that can be used to configure a set of operations to be performed for a particular block in a BB workflow, according to one embodiment. For example, block properties panel 430 may be used to configure operations to be performed for block 308 or block 313 of BB workflow 330 in FIG. 3. Block properties panel 430 includes several properties that can be selected and/or modified by a user. For example, block properties panel 430 allows the user to specify a model, a run directory, and a solver timeout for running a CP model.

Note that the block properties panels 415, 420, 425, and 430 depicted in FIGS. 4A-D and described above are only examples of block properties panels that can be configured, e.g., by a user without coding. Additional or different properties may also be included.

Figure 5:
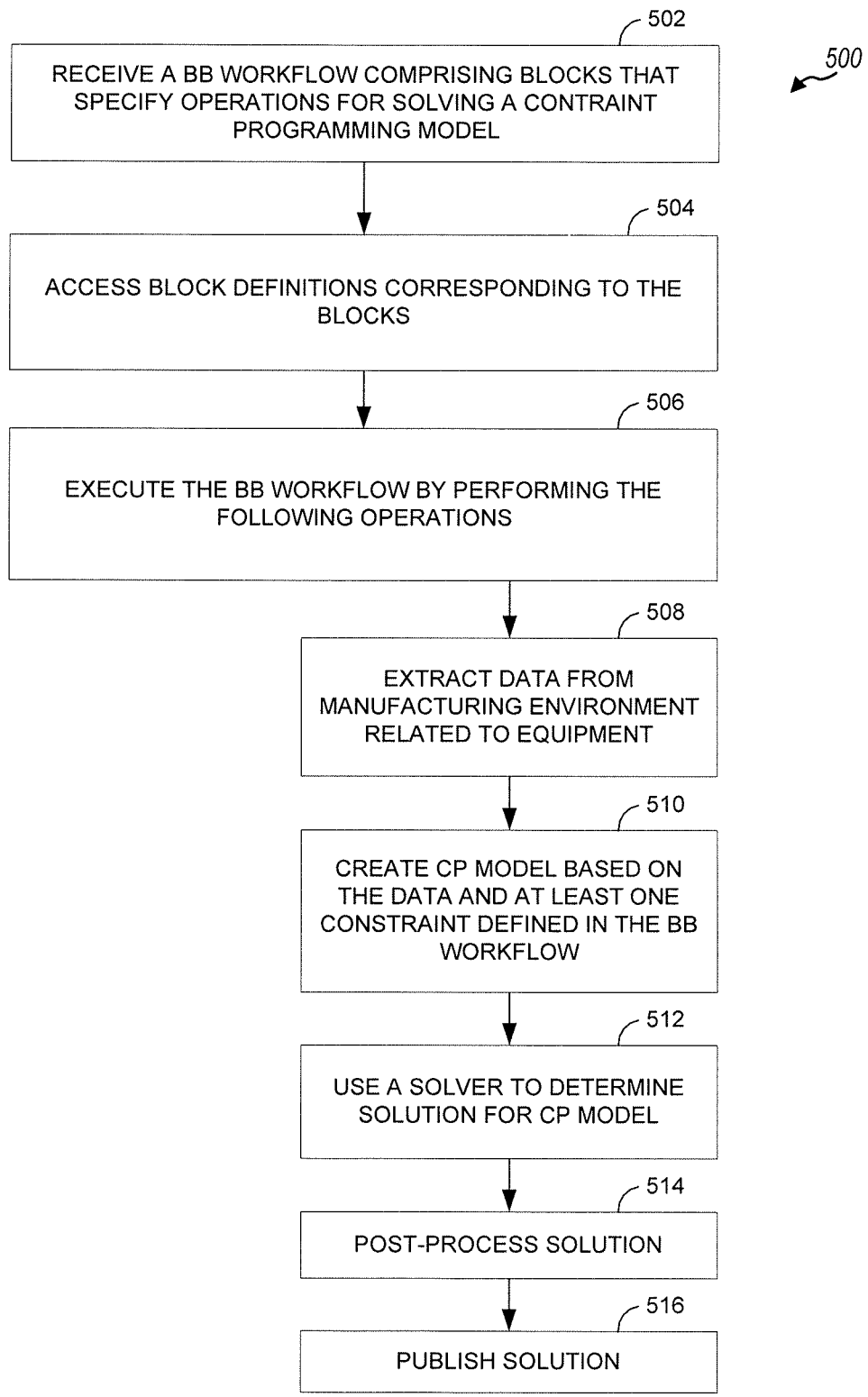
FIG. 5 is a flow diagram illustrating a method for using BB workflow to solve a CP model related to a manufacturing environment, in accordance with embodiments of the present disclosure.

FIG. 5 is a flow diagram of a method 500 for executing a BB workflow to determine a solution to a CP model related to a manufacturing environment, according to one embodiment. As shown, the method begins at block 502, where a BB CP component 120 (e.g., as shown and described with respect to FIG. 1) receives a BB workflow (e.g., from a user). The BB workflow includes a plurality of blocks that specify a set of operations for that specify operations for creating and solving a CP model related to a manufacturing environment. To perform the set of operations, at block 504, the BB CP component 120 accesses block definitions corresponding to the plurality of blocks. At block 506, the BB CP component 120 executes the BB workflow by performing the operations shown at steps 508, 510, 512, 514, and 516.

At step 508, the BB CP component 120 extracts data (e.g., via the BB reporting engine) from the manufacturing environment. In one embodiment, the data includes device data (e.g., from tools or equipment in the manufacturing environment) that describes a number of lots available for processing and one or more devices operating in the manufacturing environment. The data can include static data (e.g., equipment used by a source system, capability of different pieces of the equipment, etc.) and dynamic data (e.g., current equipment state, products being currently processed by equipment of a source system, the product characteristics, etc.). In some embodiments, the BB CP component 120 can convert the data from a first schema (or format) used by the manufacturing environment to a second schema. The BB CP component 120 can also evaluate the data in at least one of the first schema or second schema for errors, and report any errors to a user.

At step 510, the BB CP component 120 creates a CP model based on the data extracted at step 508 and at least one constraint defined by the user (e.g., via the BB workflow).

At step 512, the BB CP component 120 determines a solution to the CP model using a solver. For example, the solution may comprise a model with a single value for each variable such that all constraints are satisfied. In one embodiment, the BB CP component 120 can process the solution (e.g., converting the solution to a format used by the manufacturing environment, etc.) before publishing the solution to other devices or components.

At step 514, the BB CP component 120 post-processes the solution. Foe example, the BB CP component 120 may transform the solution into a format compatible with at least one component in the manufacturing environment so that the solution can be published to the at least one component.

At step 516, BB CP component 120 publishes the solution or post-processed solution to the at least one component in the manufacturing environment. In one embodiment, the component comprises a scheduling component that determines a schedule (e.g., including an allocation and processing order) based on the solution. One or more devices may be automated within the manufacturing environment based on the determined allocation and the processing order. For example, as mentioned above, the determined allocation and processing order may be published to dispatchers 160 to automate the one or more devices. Additionally or alternatively, the BB CP component 120 can write (or save) the solution to one or more storage systems (e.g., such as external storage system 170, etc.) in the manufacturing environment.

Figure 6:
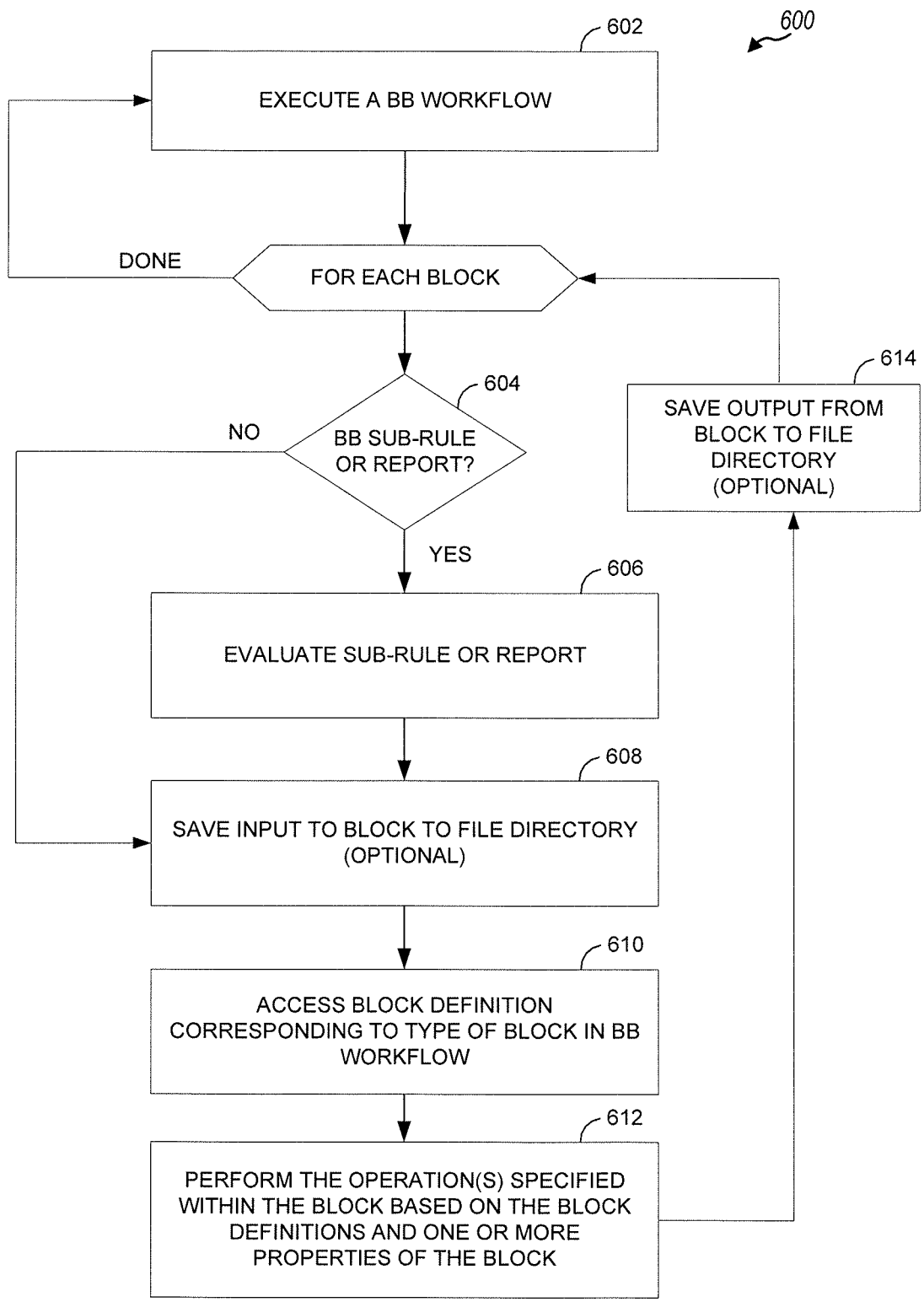
FIG. 6 is a flow diagram illustrating another method for using BB workflow to solve a CP model related to a manufacturing environment, in accordance with embodiments of the present disclosure.

FIG. 6 is a flow diagram of a method 600 for executing a block-based workflow to determine a solution to a CP model related to a manufacturing environment, according to one embodiment. As shown the method begins at block 602, where the BB CP component 120 executes a BB workflow. For each block, the BB CP component, at block 604, determines if the block is configured with a BB sub-rule or report (block 604). If so, the BB CP component 120 evaluates, at block 606, the BB sub-rule or report to determine at least one operation to perform when executing the workflow block. After evaluating the BB sub-rule or report (or if the BB CP component 120 determines the workflow block is not configured with a BB sub-rule or report), the BB CP component 120 optionally saves, at block 608, the input to the workflow block to a file directory (e.g., such as in run stores 150). In one embodiment, the BB CP component 120 can save some or all of the input from the workflow block to the file directory. In one embodiment, the BB CP component 120 can determine to save none of the input from the workflow block to the file directory (e.g., in situations where the BB CP component 120 can reproduce the state of the manufacturing environment without such data, etc.). At block 610, the BB CP component 120 accesses a block definition corresponding to a type of the block in the BB workflow. At block 612, the BB CP component 120 performs the operation(s) specified within the block based on the block definitions and one or more properties of the block. For example, as mentioned above, the BB CP component 120 can determine at least one function to call in order to execute the workflow block, based on the block definition and/or one or more properties of the block. At block 614, the BB CP component 120 optionally saves the output from the workflow block to the file directory. In one embodiment, the BB CP component 120 can save some or all of the output from the workflow block to the file directory. In one embodiment, the BB CP component can determine to save none of the output from the workflow block to the file directory (e.g., in situations where the BB CP component 120 can reproduce the state of the manufacturing environment without such data, etc.). Doing so in this manner, allows the CP system to reproduce the state of the manufacturing environment at each step of the CP run, which can be used to troubleshoot the CP process in the event of errors.

Figure 7:
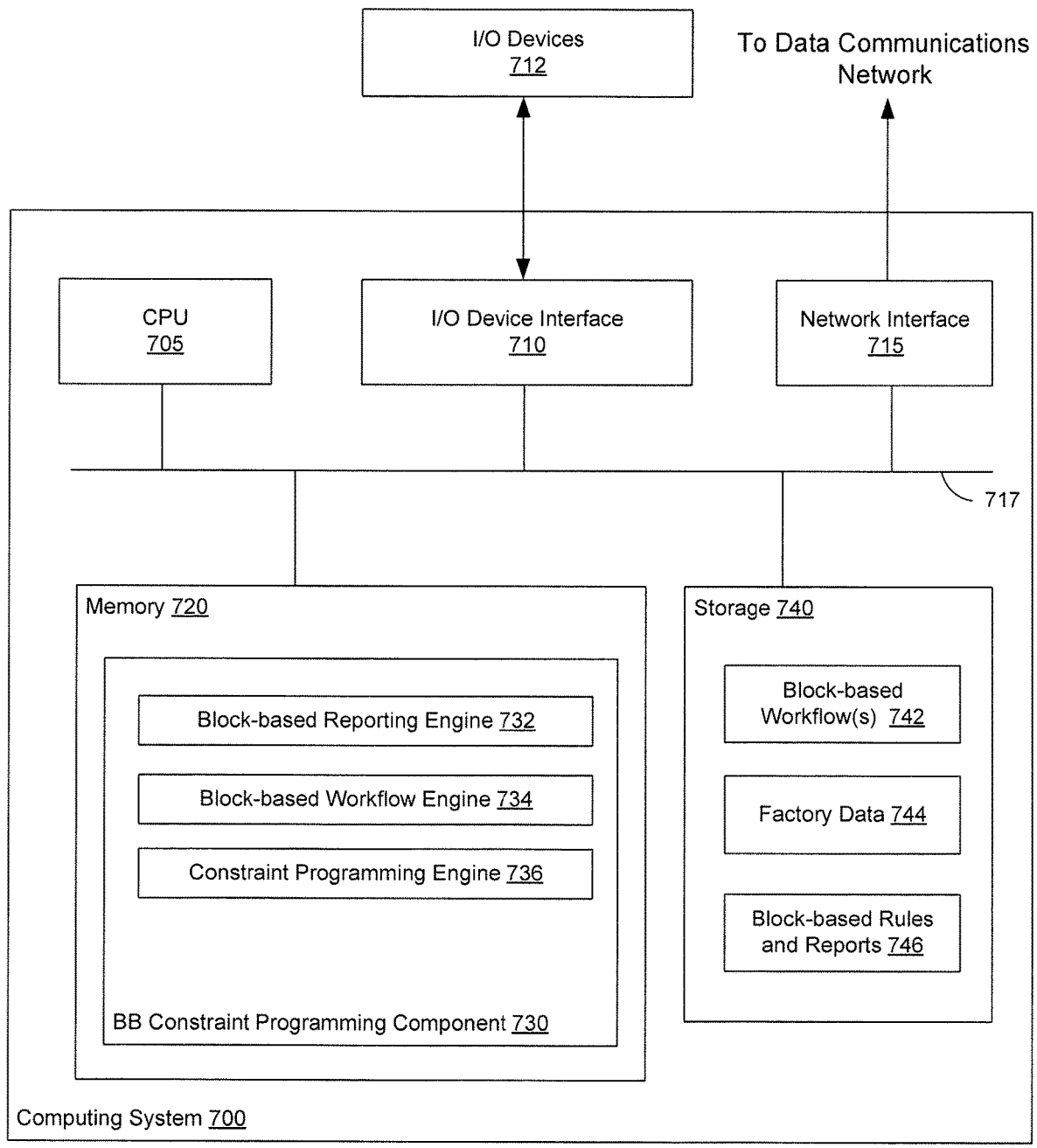
FIG. 7 illustrates a computing system configured with a block-based CP component, in accordance with embodiments of the present disclosure.

FIG. 7 illustrates a computing system 700 configured to execute a block-based workflow to determine a solution for a CP model related to a manufacturing environment, according to one embodiment. As shown the computing system 700 includes, without limitation, a central processing unit (CPU) 705, a network interface 715, a memory 720, and storage 740, each connected to a bus 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect or bus 717 is used to transmit programming instructions and application data between CPU 705, I/O devices interface 710, storage 740, network interface 715, and memory 720. Note, CPU 705 is included to be representative of a single CPU, multiple CPUs, a single CPU having multiple processing cores, and the like. Memory 720 is generally included to be representative of a random access memory. Storage 740 may be a disk drive storage device. Although shown as a single unit, storage 740 may be a combination of fixed and/or removable storage devices, such as fixed disc drives, removable memory cards, or optical storage, network attached storage (NAS), or a storage area-network (SAN).

Illustratively, the memory 720 includes a BB CP component 730, which includes BB reporting engine 732, a BB workflow engine 734, and CP engine 736. The storage 740 includes BB workflow(s) 742, factory data 744 and BB rules and reports 746. Further, although not shown, memory 720 can also include dispatchers 160, a scheduling component, etc. In one embodiment, the BB workflow engine 734 executes each of the blocks in BB workflow(s) 742. For example, as mentioned above, each block in the BB workflow(s) 742 can specify one or more operations to be performed when executing each block. Further, one or more operations can be configured with one or more BB reports and rules (e.g., stored in BB rules and reports 746). As also mentioned above, the BB workflow engine 734 can further interact with the BB reporting engine 732 and the CP engine 736 when executing the workflow blocks.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C#, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, executed in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for executing a block-based (BB) workflow to solve a constraint programming (CP) model related to a semiconductor manufacturing environment, comprising:
   receiving at least one BB workflow comprising a plurality of blocks, wherein the plurality of blocks specify a set of operations for solving the CP model;
   accessing a plurality of block definitions corresponding to the plurality of blocks; and
   executing the at least one BB workflow by performing the set of operations based on the plurality of block definitions, comprising:
      extracting data from the semiconductor manufacturing environment, wherein the data comprises both static data and dynamic data related to equipment in the manufacturing environment;
      creating the CP model based on the data and at least one constraint defined in the BB workflow, wherein the CP model comprises an executable program that includes one or more variables;
      using a solver to determine a solution to the CP model, wherein the solution to the CP model comprises one or more values for the one or more variables in the executable program that satisfy the at least one constraint; and
   publishing the solution to at least one component in the semiconductor manufacturing environment, wherein the solution is used to determine a manufacturing schedule for the semiconductor manufacturing environment.

2. The method of claim 1, wherein executing the at least one BB workflow further comprises: transforming the solution into a format compatible with the at least one component, wherein the solution is published to the at least one component in the format.

3. The method of claim 1, wherein the manufacturing schedule comprises an allocation of a number of lots to a subset of the equipment in the semiconductor manufacturing environment, start and end times for each lot processing on a tool, and a processing order in which the lots should be processed by the subset of the equipment, and wherein the subset of the equipment in the semiconductor manufacturing environment is automated based on the allocation and the processing order.

4. The method of claim 1, further comprising evaluating, for one or more blocks of the at least one BB workflow, at least one BB sub-rule or report to determine at least one operation of the set of operations to perform.

5. The method of claim 1, wherein receiving the at least one BB workflow comprises: receiving input from a user, via a user interface, that identifies the plurality of blocks.

6. The method of claim 5, wherein the input further identifies one or more links connecting the plurality of blocks.

7. The method of claim 1, wherein executing the at least one BB workflow further comprises:
writing at least one of the extracted data, the solution, or the manufacturing schedule to a storage system in the semiconductor manufacturing environment; and
upon determining an error related to determining the solution, reporting the error to a user.

8. The method of claim 1, wherein the at least one constraint comprises one of: a time restriction; and a value restriction.

9. A non-transitory computer-readable medium containing computer program code that, when executed by a processor, performs an operation for executing a block-based (BB) workflow to solve a constraint programming (CP) model related to a semiconductor manufacturing environment, the operation comprising:
receiving at least one BB workflow comprising a plurality of blocks, wherein the plurality of blocks specify a set of operations for solving the CP model;
accessing a plurality of block definitions corresponding to the plurality of blocks; and
executing the at least one BB workflow by performing the set of operations based on the plurality of block definitions, comprising:
extracting data from the semiconductor manufacturing environment, wherein the data comprises both static data and dynamic data related to equipment in the manufacturing environment;
creating the CP model based on the data and at least one constraint defined in the BB workflow, wherein the CP model comprises an executable program that includes one or more variables;
using a solver to determine a solution to the CP model, wherein the solution to the CP model comprises one or more values for the one or more variables in the executable program that satisfy the at least one constraint; and
publishing the solution to at least one component in the semiconductor manufacturing environment, wherein the solution is used to determine a manufacturing schedule for the semiconductor manufacturing environment.

10. The non-transitory computer-readable medium of claim 9, wherein executing the at least one BB workflow further comprises: transforming the solution into a format compatible with the at least one component, wherein the solution is published to the at least one component in the format.

11. The non-transitory computer-readable medium of claim 9, wherein the manufacturing schedule comprises an allocation of a number of lots to a subset of the equipment in the semiconductor manufacturing environment, start and end times for each lot processing on a tool, and a processing order in which the lots should be processed by the subset of the equipment, and wherein the subset of the equipment in the semiconductor manufacturing environment is automated based on the allocation and the processing order.

12. The non-transitory computer-readable medium of claim 9, wherein the operation further comprises evaluating, for one or more blocks of the at least one BB workflow, at least one BB sub-rule or report to determine at least one operation of the set of operations to perform.

13. The non-transitory computer-readable medium of claim 9, wherein receiving the at least one BB workflow comprises: receiving input from a user, via a user interface, that identifies the plurality of blocks.

14. The non-transitory computer-readable medium of claim 13 wherein the input further identifies one or more links connecting the plurality of blocks.

15. The non-transitory computer-readable medium of claim 9, wherein executing the at least one BB workflow further comprises:
writing at least one of the extracted data, the solution, or the manufacturing schedule to a storage system in the semiconductor manufacturing environment; and
upon determining an error related to determining the solution, reporting the error to a user.

16. The non-transitory computer-readable medium of claim 9, wherein the at least one constraint comprises one of: a time restriction; and a value restriction.

17. A system comprising:
at least one processor; and
a memory containing a program that, when executed by the at least one processor, performs an operation for executing a block-based (BB) workflow to solve a constraint programming (CP) model related to a semiconductor manufacturing environment, the operation comprising:
receiving at least one BB workflow comprising a plurality of blocks, wherein the plurality of blocks specify a set of operations for solving the CP model;
accessing a plurality of block definitions corresponding to the plurality of blocks; and
executing the at least one BB workflow by performing the set of operations based on the plurality of block definitions, comprising:
extracting data from the semiconductor manufacturing environment, wherein the data comprises both static data and dynamic data related to equipment in the manufacturing environment;
creating the CP model based on the data and at least one constraint defined in the BB workflow, wherein the CP model comprises an executable program that includes one or more variables;
using a solver to determine a solution to the CP model, wherein the solution to the CP model comprises one or more values for the one or more variables in the executable program that satisfy the at least one constraint; and
publishing the solution to at least one component in the semiconductor manufacturing environment, wherein the solution is used to determine a manufacturing schedule for the semiconductor manufacturing environment.

18. The system of claim 17, wherein executing the at least one BB workflow further comprises: transforming the solution into a format compatible with the at least one component, wherein the solution is published to the at least one component in the format.

19. The system of claim 17, wherein the manufacturing schedule comprises an allocation of a number of lots to a subset of the equipment in the semiconductor manufacturing environment, start and end times for each lot processing on a tool, and a processing order in which the lots should be processed by the subset of the equipment, and wherein the subset of the equipment in the semiconductor manufacturing environment is automated based on the allocation and the processing order.

20. The system of claim 17, wherein the method further comprises evaluating, for one or more blocks of the at least one BB workflow, at least one BB sub-rule or report to determine at least one operation of the set of operations to perform.

* * * * *